(12) United States Patent
Freudiger et al.

(10) Patent No.: US 9,578,062 B2
(45) Date of Patent: Feb. 21, 2017

(54) PORTABLE PROXY FOR SECURITY MANAGEMENT AND PRIVACY PROTECTION AND METHOD OF USE

(71) Applicant: Palo Alto Research Center Incorporated, Palo Alto, CA (US)

(72) Inventors: Julien Freudiger, Mountain View, CA (US); Ersin Uzun, Campbell, CA (US); Emiliano De Cristofaro, London (GB); Golam Sarwar, Blacktown (AU)

(73) Assignee: Palo Alto Research Center Incorporated, Palo Alto, CA (US)

( * ) Notice: Subject to any disclaimer, the term of this patent is extended or adjusted under 35 U.S.C. 154(b) by 254 days.

(21) Appl. No.: 14/244,784

(22) Filed: Apr. 3, 2014

(65) Prior Publication Data
US 2015/0288719 A1    Oct. 8, 2015

(51) Int. Cl.
H04L 29/06        (2006.01)
(52) U.S. Cl.
CPC ........... H04L 63/20 (2013.01); H04L 63/0272 (2013.01); H04L 63/0281 (2013.01)
(58) Field of Classification Search
CPC .. H04L 63/20; H04L 63/0281; H04L 63/0272; H04L 63/083; H04W 12/08
USPC ......................................................... 726/12
See application file for complete search history.

(56) References Cited

U.S. PATENT DOCUMENTS

| | | | | |
|---|---|---|---|---|
| 6,005,859 A * | 12/1999 | Harvell | ............... | H04M 1/2473 370/352 |
| 6,134,680 A * | 10/2000 | Yeomans | ............ | G06F 11/0709 709/219 |
| 6,212,574 B1 * | 4/2001 | O'Rourke | ............... | G06F 9/468 719/321 |
| 8,556,177 B2 * | 10/2013 | Hussey | .................. | A61B 5/117 235/462.01 |
| 2009/0254572 A1 * | 10/2009 | Redlich | .................. | G06Q 10/06 |
| 2011/0127325 A1 * | 6/2011 | Hussey | .................. | A61B 5/117 235/380 |
| 2013/0055356 A1 * | 2/2013 | Gafni | .................. | H04L 63/0853 726/4 |

(Continued)

OTHER PUBLICATIONS

Meet Safeplug. A Revolutionary Device to Protect Your Family and Your Home—http//pogoplug.com/safeplug.

(Continued)

*Primary Examiner* — Kambiz Zand
*Assistant Examiner* — Benjamin Kaplan
(74) *Attorney, Agent, or Firm* — Patrick J. S. Inouye; Leonid Kisselev

(57) ABSTRACT

A portable proxy for security management and privacy protection and methods of use are provided. The proxy establishes a connection to a user device. The proxy also establishes a secure connection to a virtual private network (VPN), performs authentication of the proxy to the VPN, and upon successful completion of the proxy authentication provides access to the VPN through the secure connection user credentials. Once the VPN accepts the credentials, the proxy routes at least a portion of Internet traffic between the user device and the VPN through the secure connection and the connection to the user device. The proxy can also establish a secure connection to an anonymizing service and route all Internet traffic of the user device through the anonymizing service using the secure connection and the connection to the user device.

11 Claims, 5 Drawing Sheets

(56) References Cited

U.S. PATENT DOCUMENTS

2013/0173915 A1\* 7/2013 Haulund ............... H04L 9/3226
                                                                713/159
2014/0337925 A1\* 11/2014 Marshall ................ H04L 63/10
                                                                726/4

OTHER PUBLICATIONS

Tor—https://www.torproject.org/about/overview.html.en.
Snort—http://www.snort.org/snort.

\* cited by examiner

PORTABLE PROXY FOR SECURITY MANAGEMENT AND PRIVACY PROTECTION AND METHOD OF USE

FIELD

This application relates in general to providing privacy and security during online communications, and in particular, to a portable proxy for security management and privacy protection and method of use.

BACKGROUND

Online threats, such as malware and technologies for tracking a user's online activity, continue to grow. Remaining safe while using the Internet has become a challenge both for individuals and for organizations. Protecting an organization's private computer network from online threats is particularly problematic due to the security challenges raised by the diversity of an organization's employees' tasks and business, ranging from e-mailing to accounting to Web-development, processes that typically take place on the organization's network.

The problem is further exacerbated due to a large and disparate population of devices across which Information Technology (IT) departments of organizations must enforce security policies. Generally, organizational IT departments either rely on third party software for remote computer administration, such as commercial security software for enforcing firewall protection, or provide their employees with a series of tutorials specific to different device configurations, such as the steps to configure a Virtual Private Network Connection (VPN) connection on the employees' mobile devices.

With the proliferation of the so-called "Bring Your Own Device" culture, which involves employees supplying their own computing devices for work-related purposes, organizations have struggled to balance employee convenience and security policy enforcement. Standard security policies include blacklisting specific websites, limiting time spend online, mandating the use of encryption software, and user access control to specific services (such as internal Wikis, blogs or other web services). Individuals have also faced non-organization-specific issues, such as technologies that track a user's Internet activities, which raises personal privacy concerns.

Current protections from these online threats at an individual and at an organization level are insufficient. For example, the anonymizing service Tor™ (previously an acronym for "The Onion Router") developed by the Tor Project Inc. of Walpole, Mass., conceals a user's IP address, location, and Internet activities by routing the user's Internet traffic through multiple nodes. Layered encryption is used at each of the nodes. The Tor™ service requires an advanced knowledge of the applications being used or a willingness to make a change in the user's Web-browsing habits. For instance, using the Tor™ service requires the user to either configure each online application on his computing device to route traffic through the Tor™ service, or to use the Tor™ service Web-browser. Furthermore, some applications cannot be configured to be used with the Tor™ service, and thus a user may not be able to keep all Internet traffic private.

The Safeplug™ device, developed by Cloud Engines, Inc. of San Francisco, Calif., requires a user to connect the device to his Internet router. The user must then visit a specific Webpage to enable the Safeplug™ device to direct the user's Internet traffic through the Tor™ service. As the Safeplug™ device requires the user to have physical access to an Internet router, such as via an Ethernet cable, the Safeplug™ device physically limits where the user can browse the Internet anonymously.

Therefore, there is a need for a way to accommodate the "Bring Your Own Device" work-place culture without endangering the security of a network of an organization and for providing personal privacy protection from online threats.

SUMMARY

An organization-controlled proxy device allows using user computing devices, including "BYOD" machines, to connect to an organization's virtual private network while enforcing applicable security policies. The proxy can enforce the security policies through user device Internet traffic filtering and intrusion detection monitoring. The proxy also serves a second role in user authentication during remote accessing of the virtual private network. Finally, the proxy can provide automated privacy protection to all connected user devices by routing all Internet traffic from the devices through an anonymizing service, such as the TOR™ service, without requiring installation of a dedicated software or a change in the user's Web-browsing habits.

In one embodiment, a portable proxy for network security management is provided. The proxy includes a communication interface to connect to a user device and to securely connect to a virtual private network. The proxy also includes a memory to store proxy authentication data. The proxy also includes a processor coupled to the memory and configured to execute code that includes: an authentication module configured to use the proxy authentication data for performing a proxy authentication protocol with the virtual private network through the secure connection; a user module to provide through the secure connection user credentials to the virtual private network following a successful completion of the proxy authentication protocol; and routing module to route between the user device and the virtual private network at least a portion of user device Internet traffic through the secure connection and the connection to the user device following an acceptance of the credentials by the virtual private network.

In a further embodiment, a portable proxy for privacy protection is provided. The proxy includes a communication interface to connect to a user device and to securely connect to an anonymizing service. The proxy further includes a processor coupled to a memory to execute code that includes a routing module to route substantially all Internet traffic of the user device through the anonymizing service using the connection to the user device and the secure connection.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

A portable proxy increases protection from online threats. The proxy can be configured to serve purposes of an organization, such a business entity or a corporation, a governmental unit, an educational institution, or other collaborative groupings of users. For example, the proxy can be used for improving authentication of users authorized to access the organization's computer network, such as the organization's employees, contractors, and other individuals associated with the organization. The proxy also enables an individual to take advantage of anonymizing services such as the Tor™ service.

Figure 1:
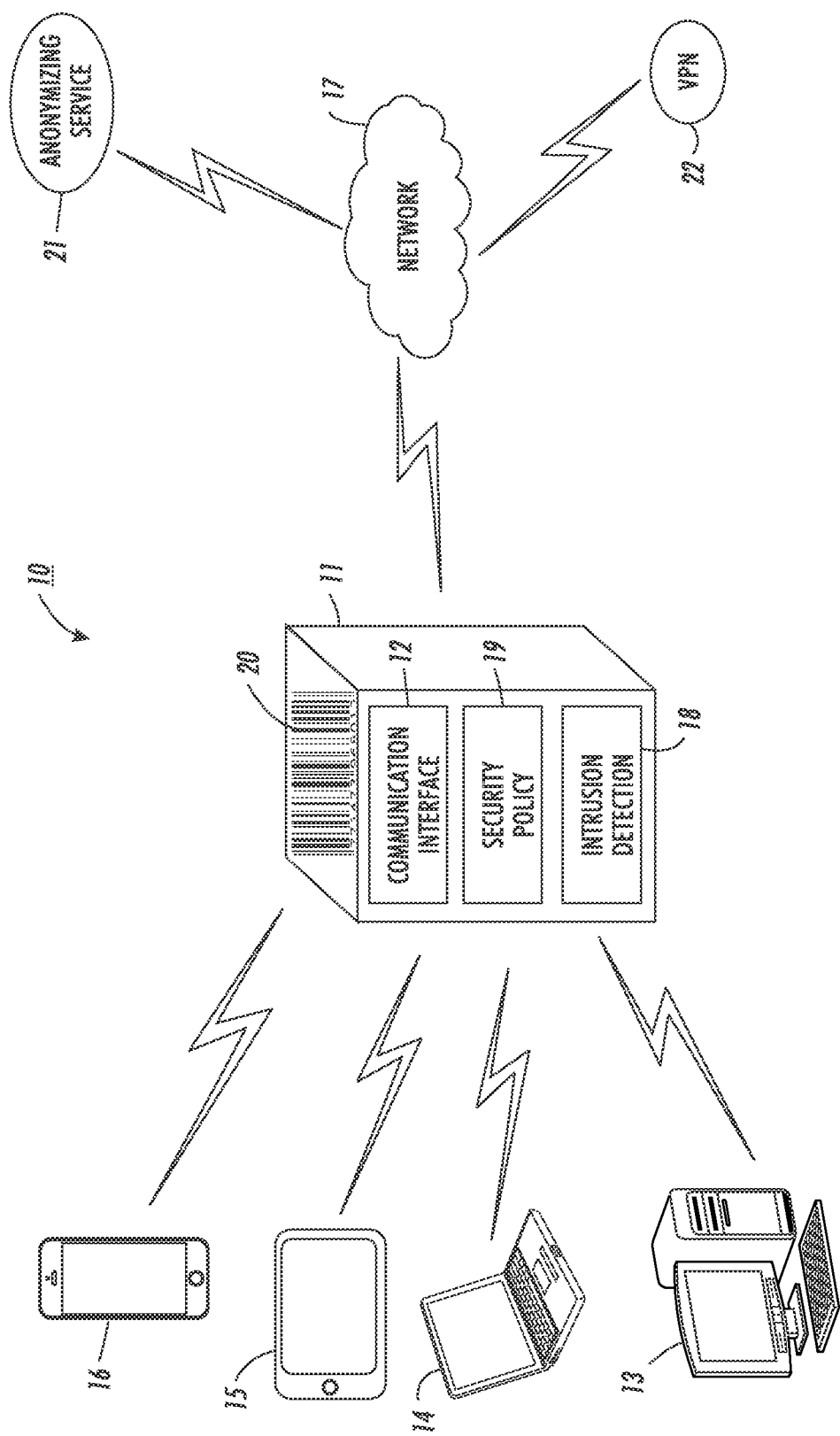
FIG. 1 is a block diagram showing a system for using a portable proxy for security management and privacy protection in accordance with one embodiment.

FIG. 1 is a block diagram showing a system 10 for using a portable proxy for security management and privacy protection in accordance with one embodiment. The system 10 includes a portable proxy 11 that enables an organization to enforce the organization's security policies on the organizational network and provides privacy for a user's Internet activities. The proxy 11 includes a communication interface 12 that can connect to one or more user devices 13-16, such as desktop computers 13, laptop computers 14, smartphones 15, and tablets 16; other kinds of user devices 13-16 are possible. In one embodiment, the device interface 12 includes a wireless transceiver that can establish a wireless network (not shown), such as a Wi-Fi network, to which the user devices 13-16 can connect and through which the user devices 13-16 can connect to the proxy 11. The wireless network can be a secure wireless network or an unsecure network, as further described below. The device interface 12 can also include one or more ports, such as an Ethernet port, for connecting to the user devices 13-16 via a wired connection.

Figure 4:
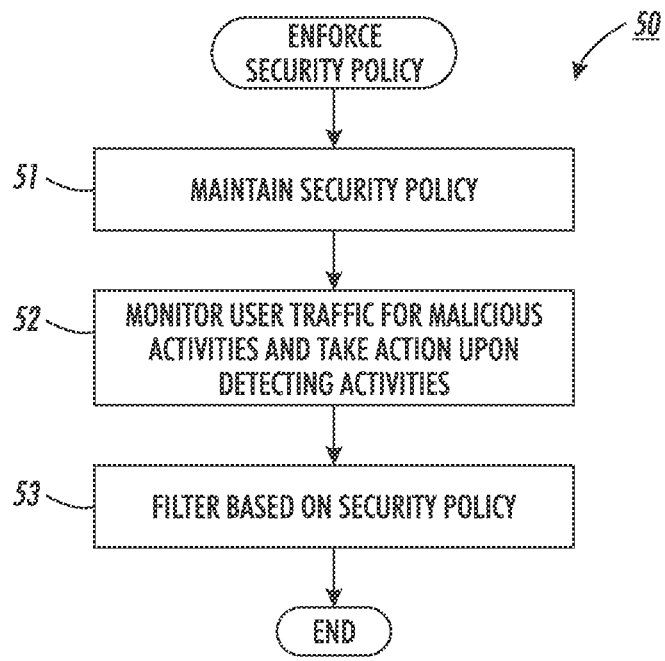
FIG. 4 is a flow diagram showing a routine for enforcing security policy of the organization for use in the method of FIG. 2 in accordance with one embodiment.
Figure 6:
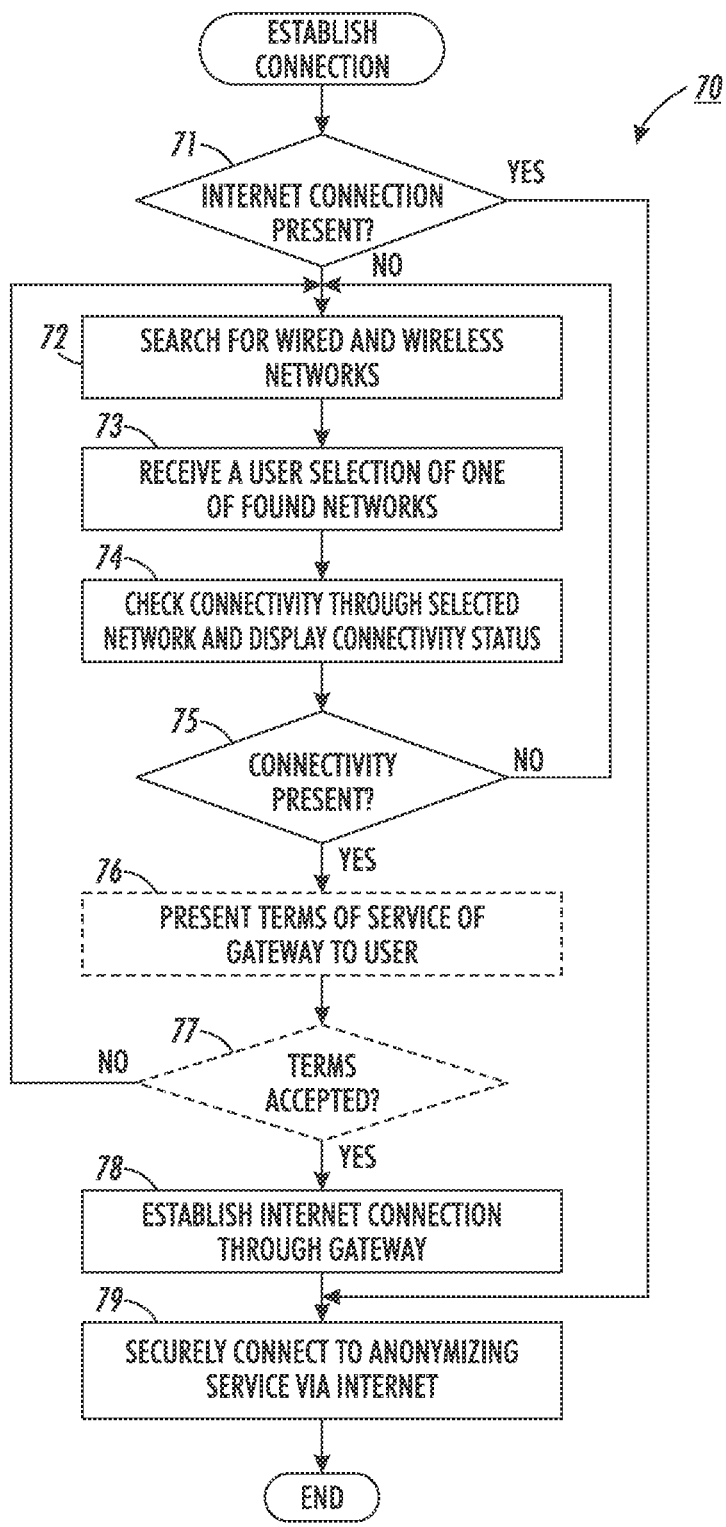
FIG. 6 is a flow diagram showing a routine for connecting to an anonymizing service for use in the method of FIG. 5 in accordance with one embodiment.

The communication interface 12 can also connect to an Internetwork 17, such as the Internet, as further described below with reference to FIGS. 4 and 6. For example, the wireless transceiver can establish a wireless connection to an Internet gateway and access the Internet through the gateway. The connection to the Internet gateway can also be established through one of the ports, such as an Ethernet port, via a wired connection.

The proxy 11 further includes a central processing unit (CPU) that can execute program code and a memory. The memory can include random access memory (RAM) as well as non-volatile secondary storage, which can be removable storage, such as an SD card or a USB stick. The memory can store an operating system, such as a Unix-like operating system, such as Linux, which can be used for the operation of the proxy 11; other operating systems are possible. In a further embodiment, other types of memory, such as a hard drive or CD ROM drive can be included in the proxy 11. Still other types of memory are possible. The proxy 11 can include a USB port and can be powered through the USB port; in a further embodiment, the proxy 11 can also be powered through other types of external and internal power sources, such as an onboard battery. In one embodiment, the proxy 11 can include any model of the Raspberry Pi® device, manufactured by the Raspbery Pi® Foundation of Caldecote, Cambridgeshire, United Kingdom. Other types of devices can be included in the proxy 11.

In one embodiment, the proxy 11 can be a "headless computer," a computer configured to operate without peripheral devices such a monitor, keyboard, and mouse. In a further embodiment, the proxy 11 can also include ports for connection to peripheral devices, such as user interfacing means, like a keyboard, and a computer display. Program code, which can be implemented as modules and include software programs, and data are loaded into the RAM for execution and processing by the CPU and results are generated for display, output, transmittal, or storage. For example, the proxy 11 can maintain intrusion detection software 18, which can detect intrusions and filter Internet traffic of the user device 13-16. The software can be a commercially available software, such as the Snort® software developed by Sourcefire, Inc. of Columbia, Md., though other software can also be used. The proxy 11 can further store a security policy 19 applicable to organization, such a list of blacklisted and whitelisted URLs, a list of signatures for malicious activities recognizable by the Snort® software, as well as media access control ("MAC") addresses and other uniquely-identifying indicia of user devices 13-16 that can be used during filtering of user Internet traffic. Other information can also be included into the security policy 19, including limitations on the user's online behavior and instructions to monitor user behavior. The intrusion detection software 18 can filter the Internet traffic based on the organizational security policy 19. The proxy can further store other software.

The proxy 11 can further include information that can be used to verify that a user legitimately is in physical possession of the proxy 11, with the possession verification information being required to access the wireless network generated by the communication interface 12 of the proxy 11. For example, a physical housing of the proxy 11 can include a barcode 20 that needs to be scanned by a user device 13-16 to allow the user device 13-16 to access the network created by the proxy 11. Alternatively, the housing of the proxy can include a password and a name of the network (not shown) created by the proxy 11, such as the network SSID, that need to be provided by the user device 13-16 to connect to the proxy 11. In one embodiment, the possession verification information can be displayed on the exterior of the housing, such as on a sticker attached to the housing. In a further embodiment, the possession verification information can also be stored inside the housing of the proxy 11, such as on an RFID tag, which can be read by a scanner connected by a user device 13-16. In a still further embodiment, the housing of the proxy 11 can host an RFID scanner, which can read RFID tags external to the proxy 11. For example, the RFID scanner can read the employee ID of the user from an RFID tag included in the user's employee badge, and thus verify that the proxy is in possession of the user with the badge. Other kinds of information can be used for verifying the physical possession. While shown to be shaped as a cube, the housing of the proxy 11 can be of any shape and size suitable to store the components described above, and for the proxy 11 to remain portable by intended users.

Through the Internetwork 17, the proxy 11 can create a secure connection to an anonymizing service 21. The anonymizing service 21 can be any Internet service that acts as an intermediary between a client computing device, such as the user device 13-16, and a destination on the Internet in an attempt to protect the information regarding the client device and the user of the client device. For example, one type of the anonymizing service can be the Tor™ service, which as mentioned above, provides privacy for user Internet communications by relaying user traffic through multiple nodes before delivering the data packets to the destination server and back to the client computer. Layered encryption is used at each of the nodes. Other types of anonymizing services 21 are possible.

Through the Internetwork 17, the proxy 11 can also create a secure connection to a virtual private network (VPN) 22 of an organization. The VPN 22 can be any extension of a private network, such as a corporate intranet network, over a public network, such as the Internet, that allows a remote client, such as a user device 13-16, to securely communicate with the private network. For instance, for one type of a VPN 22, a secure point-to-point connection between the client and a VPN 22 using an Internet tunneling protocol, with the VPN 22 transferring data between the private network and the client after authenticating the client. Other types of VPN 22 are possible.

Once the connection to either the VPN 22 or the anonymizing service 21 is established, the proxy 11 can route packets of data between the user device 13-16 and either the anonymizing service 21 or the VPN 22. Conventionally, the term "routing" is used to describe directing to a destination traffic of packets of data between devices using the same communications protocol in a heterogeneous network, while the term bridging is used to describe directing of traffic of data packets between devices using different protocols and conversion of the traffic of data packets for recognition by the different protocols. For the purposes of this application, the term "routing" can include both direction of user traffic between devices using the same protocol, and direction of the traffic between devices using different protocols and conversion of the traffic for recognition by these protocols.

A user can easily switch between using the proxy to access an anonymizing service 21, a VPN 22, or other destinations on the Internet. When connected to the anonymizing service 21, all of the data packets flowing between the user device 13-16 and a destination on the Internet (Internet traffic) can be routed by the proxy 11 to and from the anonymizing service 21, with the anonymizing service 21 delivering the packets to the destination on the Internet and delivering packets directed from the destination to the user device to the proxy 11. In the case of the connection to the VPN 22, the proxy 11 can connect the user device 13-16 either exclusively to the VPN 22, or allow sending the data packets to other destinations on the Internet, depending on the security policy 19 applicable to the organization. Thus, either the entirety or only a portion of the user device Internet traffic can be routed to the VPN 22 owned by an organization.

The use of the proxy 11 alleviates the burdens experienced by an organization in enforcement of applicable security policies. Traditionally, if the organizational policy enforcement is outsourced to third parties, then an organization must trust that the third parties will maintain applicable software, support all kinds of digital equipment, and provide up-to-date security; the organization's IT departments also pay licensing costs, and have to integrate the third-party software into the organization's network. If the policy enforcement is outsourced to employees, the organization must rely on the employees to follow internal tutorials, download appropriate software, maintain their configuration up-to-date, and configure each of their devices manually. In either case, the organization must give up a certain amount of control over keeping the devices used during work safe. The proxy 11 lifts this burden by permitting use of personal computer devices for work-related purposes and connecting to the organization's VPN 22 while making sure that the security policies applicable to the organization are enforced.

The proxy 11 also serves as a way to authenticate the users to the VPN 22, with the users' physical possession of the proxy 11 serving as an additional proof of the employees' identities and the right to access the organization's VPN 22. Thus, the use of the proxy 11 allows the organization to authenticate a user's right to connect to the VPN 22 based on at least two factors: the user's user name and password, and the user's possession of the proxy 11.

Figure 2:
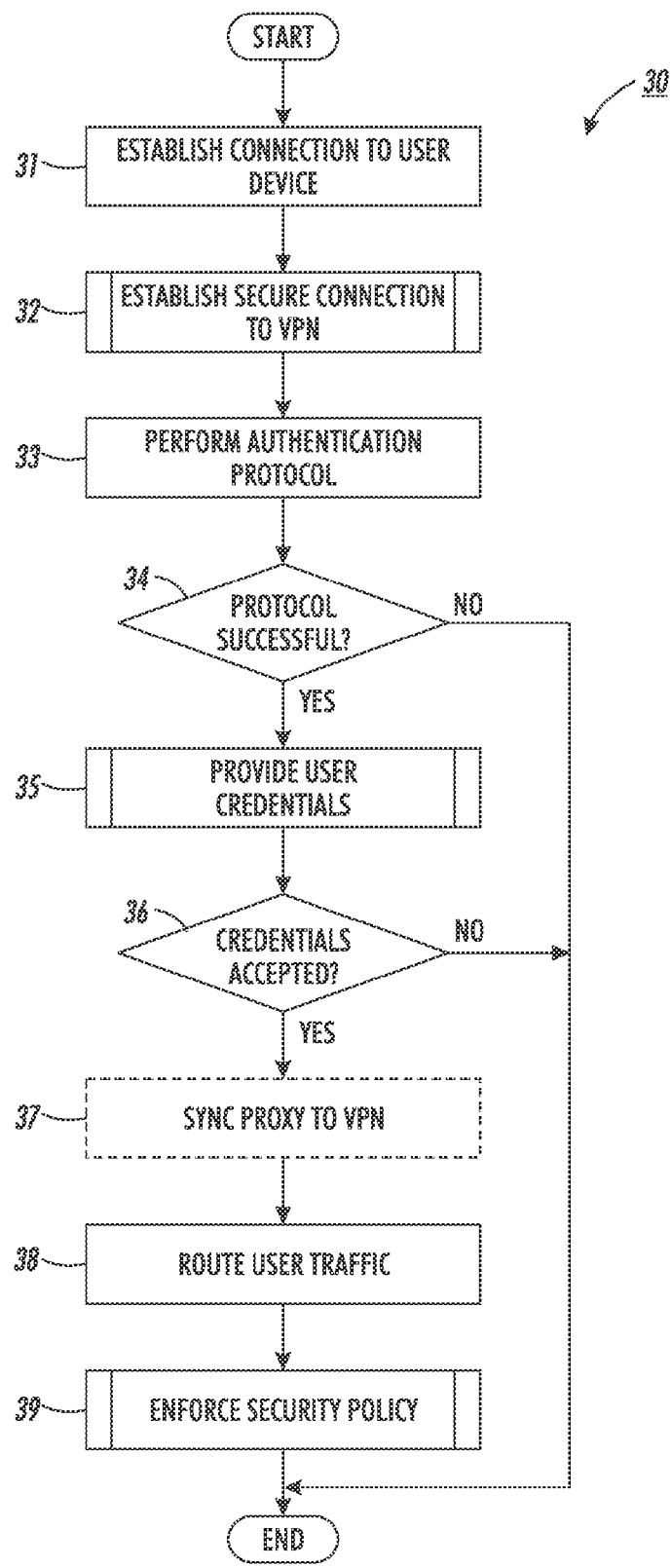
FIG. 2 is a flow diagram showing a computer-implemented method for proxy-based organization security management in accordance with one embodiment.

FIG. 2 is a flow diagram showing a method 30 for proxy-based organization security management in accordance with one embodiment. Initially, the proxy 11 establishes the connection to at least one user device 13-16 using the proxy's communication interface 12 (step 31). For instance, the communication interface 12 of the proxy 11 can create a secure wireless network using the wireless transceiver. A user device 13-16 can connect to the secure wireless network by providing information verifying the user's physical possession of the proxy 11, such as the network name and password displayed on the surface of the proxy 11, or by providing the scan of the barcode 20 displayed on the surface of the proxy 11; other ways for the user device to connect to the secure wireless network are possible. In a further embodiment, the proxy 11 can establish an unsecured wireless network and allow all user devices 13-16 to connect to the network; subsequent device authentication can be done at the VPN-level as described below with reference to step 36, with the proxy 11 also filtering Internet traffic based on the MAC address or other uniquely identifying indicia of the device 13-16, as further described with reference to FIG. 4. In a still further embodiment, the proxy 11 and the user device 13-16 can connect via a wired connection. The proxy 11 also establishes a secure connection to VPN 22 of the organization as further described with reference to FIG. 3 (step 32).

Once the secure connection is established, the proxy 11 contacts the VPN 22 and performs a proxy authentication protocol with the VPN 22 to authenticate the proxy 11 to the VPN 22 through the secure connection (step 33). The authentication protocol can include providing to the VPN 22 a public key certificate stored on the proxy 11. In one embodiment, the public key certificate can be signed by the IT department of the organization whose VPN 22 the proxy 11 is contacting. In a further embodiment, the public key certificate can be signed by another entity. Alternatively to providing the public key certificate, the proxy 11 can initiate a shared key exchange protocol with the VPN 22 as part of the authentication protocol; any asymmetric cryptography key held by the VPN 22 and the proxy 11 is suitable for the protocol. The key can be provided to the proxy 11 prior to the initiation of the method 30. Other ways to perform the authentication protocol are possible, including using proxy authentication data other than the shared key and the public key certificate.

If the authentication protocol is not successfully completed (step 34), the method 30 ends; in a further embodiment, the proxy 11 can attempt to perform the authentication protocol again one or more times. If the authentication protocol is successfully completed, with the VPN 22 determining that the VPN 22 is being contacted by an authorized proxy 11, the proxy 11 provides user credentials to the VPN 22 through the secure connection (step 35), which the VPN 22 can use to determine whether to allow packets of data from the user device 13-16 to enter the VPN 22. The user credentials can include the user name and password of the user associated with the user device 13-16; the credentials can be requested and received from the user through the user device 13-16. In a further embodiment, the proxy 11 can determine the MAC address of the user device 13-16 and provide the MAC address or other indicia uniquely identifying the user device 13-16 as part of the user credentials. The VPN 22 can store a list of MAC addresses, or the indicia, that are associated with the users permitted to access the VPN 22, and deny access to user devices 13-16 whose MAC addresses, or the other indicia, are not on the list. The VPN 22 can also compare the user name and password to the user names and passwords of users authorized to access the VPN 22 and deny access if provided credentials do not match the authorized user names and passwords.

If the credentials are not accepted by the VPN 22 (step 36), the method 30 ends; in a further embodiment, the proxy 11 can attempt to provide the credentials again one or more times, such as after requesting the user to confirm the user name and password through the user device 13-16. If the credentials are accepted (step 36), optionally, the proxy 11 can sync with the VPN 22 (step 37). During the syncing process, the proxy 11 can receive from the VPN 22 updates on the applicable security policy 19, such as a list of malicious SNORT signatures or a list of black-listed URLs. In a further embodiment during the syncing process the proxy can receive an updated public key certificate signed by the IT department of the organization; the updated public key certificate can also be received by the proxy 11 at a different point in the method 30. In a still further embodiment, during the syncing process, the proxy 11 can receive updates of software other than the intrusion detection software. Also, following the acceptance of the credentials (step 36), the proxy starts routing traffic between the user device 13-16 and the VPN 22 using the secure connection and the connection to the user device 13-16 (step 38). The proxy 11 also starts executing the stored security policy 19 (step 39), as further described with reference to FIG. 4, ending the method 30. In a further embodiment, if the user device is connected to a destination on the Internet other than the VPN 22, the enforcement of the security policy 19 can be performed at another point in the method 30.

Figure 3:
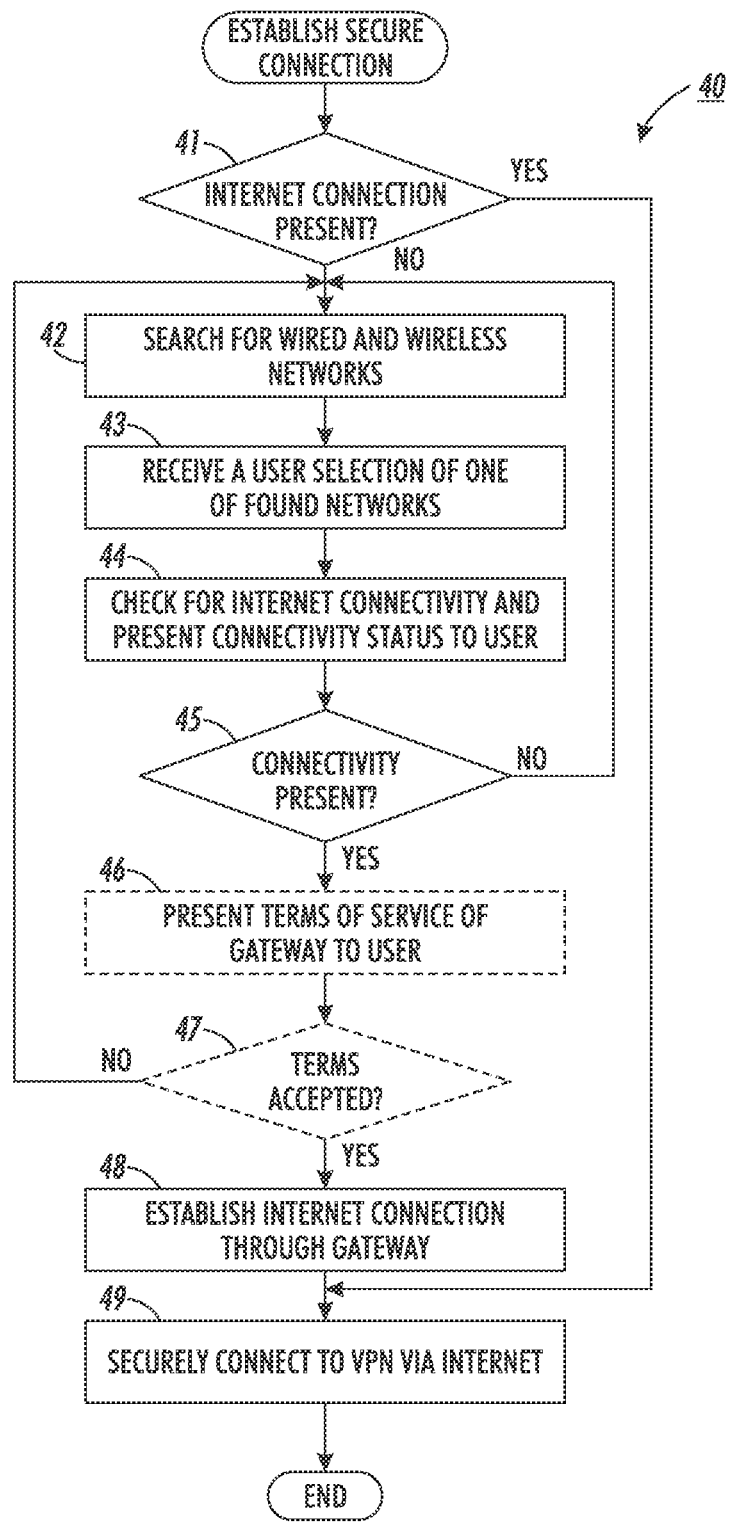
FIG. 3 is a flow diagram showing a routine for establishing a secure connection to a VPN for use in the method of FIG. 2 in accordance with one embodiment.

The secure connection between the VPN 22 and the proxy 11 allows to protect the secrecy of information exchanged during the steps of the method 30. FIG. 3 is the routine 40 for establishing a secure connection to the VPN 22 for use in the method 30 of FIG. 2 in accordance with one embodiment. Initially, the proxy 11 checks whether the proxy 11 is connected to the Internet, such as through a wired connection (step 41). If the proxy 11 is connected to the Internet (step 41), the routine 40 moves to step 49 described below. If the proxy 11 is not connected to the Internet (step 41), the proxy 11 searches for networks, wireless and wired, accessible to the proxy 11 and presents a list of the networks to the user via the user devise 13-16, such as through the user's Internet browser (step 42). The proxy 11 receives the user selection of the one of the networks presented through the user device 13-16 (step 43). The proxy 11 checks for Internet connectivity via the selected network and shows connectivity status to the user (step 44). If no Internet connectivity is present (step 45), the routine 40 returns to step 42. If Internet connectivity is present (step 45), optionally, if required by the Internet gateway associated with the selected network, the proxy 11 can present to the user terms of service of the gateway (step 46), and accept the terms upon receiving a user command (step 47). If the terms are accepted (step 47), the proxy 11 establishes the connection to the Internet through the gateway using the selected network (step 48). If the terms are not accepted (step 47), the routine 40 returns to step 42. The proxy 11 then uses the Internet gateway to contact the VPN 22 and establish the secure connection through means such as encryption and using tunneling protocols to create a tunnel between the Internet gateway and the VPN 22, ending the routine 40 (step 49). Other ways to create the secure connection are possible.

The use of the proxy 11 simplifies enforcement of an organization's security policy across all devices used by the organization's employees. FIG. 4 is a flow diagram showing a routine 50 for enforcing the security policy 19 applicable to the organization for use in the method 30 of FIG. 2 in accordance with one embodiment. The proxy 11 maintains the security policy 19 applicable to the organization (step 51), such as a list of malicious SNORT signatures and a list of blacklisted URLs that users cannot access during work and a list of whitelisted URLs that the user may access, and other limitations on user online activities. In a further embodiment, the security policy 19 may be specific to a MAC address, or other uniquely-identifying indicia, of a particular device 13-16, and the relevant MAC addresses are stored by the proxy 11 as part of the policy. The proxy 11 also maintains the intrusion detection software 18, which is used to monitor traffic exchanged between the user device 13-16 and the VPN 22 or other destinations on the Internet for malicious activities, such as attempts to hack or insert malware on the user device 13-16, and to take action upon detecting the activities (step 52). Such actions can include reporting the detected activity, to the VPN 22 for example, and cutting off the user device 13-16 from the Internet connection to counter the activity; other actions are possible. In a further embodiment, if the user device 13-16 sends encrypted packets of information to a destination on the Internet other than the VPN 22 via a secure connection, through use of protocols such as https or ssl, the proxy 11 can monitor the encrypted packets by using what is known as the "man-in-the-middle attack." For instance, the proxy 11 can intercept the creation of the secure connection, monitor the content of the encrypted packets exchanged, and after learning of the content of the packets, forward the packets between the destination and the user device 13-16. Other ways to execute the man-in-the-middle attack are possible. Finally, the proxy 11 can filter the user traffic in accordance with the security policy using the intrusion detection software 18 (step 53). For example, the proxy 11 can block the user device 13-16 from accessing sites whose URL's are blacklisted and allow access to sites whose URLs are whitelisted. Similarly, the proxy 11 may also limit the time an employee spends online, perform deep packet inspection, monitor user online behavior, and limit access to specific online services. Other ways to filter the traffic are possible.

Figure 5:
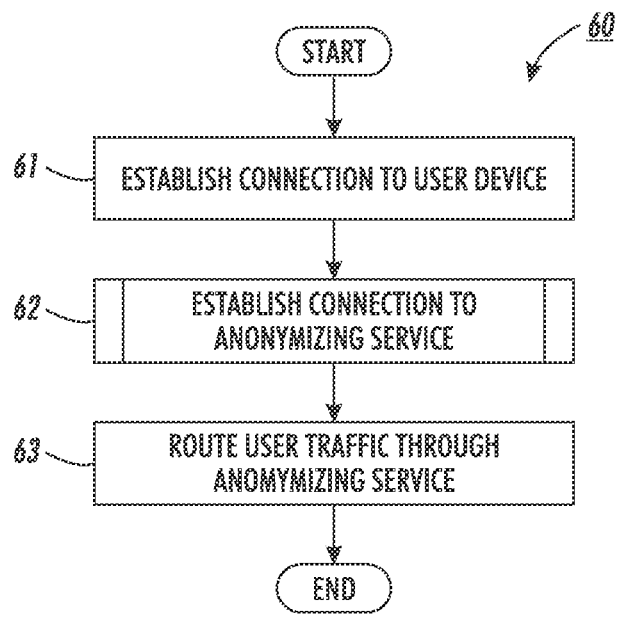
FIG. 5 is a flow-diagram showing a computer-implemented method for proxy-based protection of Internet privacy in accordance with one embodiment.

While the method 30 of FIG. 2 allows improved enforcement of organizational Internet security policies and authentication of users trying to access the organizational VPN 22, the proxy 11 also facilitates Internet privacy of an individual user by providing improved access to anonymizing networks 17, such as the Tor™ service or another anonymizing service 21. FIG. 5 is a flow diagram showing a computer-implemented method 60 for proxy-based protection of Internet privacy in accordance with one embodiment. A connection between the proxy 11 and the user device 13-16 is established (step 61). The connection can be wireless or wired. For example, the proxy 11 can establish a wireless network to which the user device 13-16 can connect. If the network is secure, the device 13-16 can gain access to the network as described above with reference to step 31 and FIG. 1 above. The proxy 11 also establishes a secure connection to an anonymizing service 21 as further described below with reference to FIG. 6 (step 62). The anonymizing service 21 can be the Tor™ service, though other anonymizing services 21 are possible. Once both connections are established, the proxy 11 starts routing all, or substantially all, user device Internet traffic, all or substantially all data packets flowing between the user device 13-16 and a destination on the Internet, through the anonymizing service 21 (step 63), ending the method 60. As the proxy 11 is portable, the method 60 allows to increase a user's Internet privacy regardless of the location where the user wants to access the Internet.

Securely connecting to the anonymizing service 21 allows to protect the user traffic before the traffic enters the anonymizing service 21. FIG. 6 is a flow diagram showing a routine 70 for establishing a secure connection to the anonymizing service 21 for use in the method 60 of FIG. 5 in accordance with one embodiment. Initially, the proxy 11 checks whether the proxy 11 is connected to the Internet, such as through a wired connection (step 71). If the proxy 11 is connected to the Internet (step 71), the routine 70 moves to step 79 described below. If the proxy 11 is not connected to the Internet (step 71), the proxy 11 searches for networks, wireless and wired, accessible to the proxy 11 and presents a list of the networks to the user via the user devise 13-16, such as through the user's Internet browser (step 72). The proxy 11 receives the user selection of the one of the networks presented through the user device 13-16 (step 73). The proxy 11 checks for Internet connectivity via the selected network and shows connectivity status to the user (step 74). If no Internet connectivity is present (step 75), the routine 70 returns to step 72. If Internet connectivity is present (step 75), optionally, if required by the Internet gateway, the proxy 11 can present to the user terms of service of the Internet gateway (step 76), and accept the terms upon receiving a user command (step 77). If the terms are accepted (step 77), the proxy 11 establishes the connection to the Internet through the gateway using the selected network (step 78). If the terms are not accepted (step 77), the routine 70 returns to step 72. The proxy 11 then uses the Internet connection through the Internet gateway to establish the secure connection to the anonymizing service 21 (step 79). For example, the proxy 11 can establish a tunnel to one of the nodes of used by the Tor™ service, though other ways to create the secure connection are possible.

As previously stated, users can switch on and off between accessing the anonymizing service such as Tor and the VPN 22 access as well as also directly connect the user device 13-16 to the Internet. The proxy 11 can apply the security policy 19 to control user browsing during either of these scenarios.

While the invention has been particularly shown and described as referenced to the embodiments thereof, those skilled in the art will understand that the foregoing and other changes in form and detail may be made therein without departing from the spirit and scope of the invention.

What is claimed is:

1. A portable proxy for network security management, comprising:
a housing on which a barcode is comprised, the barcode comprising possession verification information;
a communication interface configured to connect to a user device and to securely connect to a virtual private network, the communication interface comprising a wireless transceiver configured to create a wireless network through which the communication interface connects to the user device;
a memory configured to store proxy authentication data; and
a processor coupled to the memory and configured to execute code, comprising:
a permission module configured to receive the possession verification information from the user device and to allow the user device to connect to the wireless network upon receiving the possession verification information;
an authentication module configured to perform a proxy authentication protocol with the virtual private network using the proxy authentication data through the secure connection;
a user module configured to provide through the secure connection user credentials upon a successful completion of the proxy authentication protocol; and
a routing module configured to route at least a portion of user device Internet traffic between the user device and the virtual private network through the secure connection and the connection to the user device following an acceptance of the credentials by the virtual private network.

2. A proxy according to claim 1, further comprising:
a credentials module configured to obtain the credentials, comprising at least one of:
an address module configured to determine the credentials comprising a MAC address of the user device;
a receipt module configured to receive the credentials comprising a user name and a password of the user from the user device.

3. A proxy according to claim 1, comprising at least one of:
a certificate module configured to provide a public key certificate comprised in the proxy authentication data to the virtual private network; and
a shared key module configured to perform a shared key exchange with the virtual private network using the proxy authentication data.

4. A proxy according to claim 1, further comprising:
a security policy associated with the virtual private network stored in the memory; and
a filtering module configured to filter the user device Internet traffic based on the security policy.

5. A proxy according to claim 4, wherein the filtering comprises at least one of blocking the user device from accessing Internet sites blacklisted in the security policy, allowing access to Internet sites whitelisted in the security policy, limiting a time during which the user device can access the Internet, performing deep packet inspection, monitoring online behavior of a user associated with the user device, and limiting access to one or more Internet services.

6. A proxy according to claim 4, further comprising:
an intrusion detection module configured to monitor the user device Internet traffic and to take an action based on the monitoring and the security policy.

7. A proxy according to claim 6, further comprising:
an interception module configured to intercept the user device Internet traffic exchanged between the user device and a destination on the Internet other than the virtual private network; and
a relay module to relay the intercepted traffic between the destination and the user device.

8. A proxy according to claim 4, further comprising:
a syncing module configured to receive one or more of a software update, an update to the security policy, and an update to the proxy authentication data from the virtual private network through the secure connection.

9. A proxy according to claim 1, further comprising:
a connection module configured to determine whether the communication interface is connected to the Internet;
a search module configured to search for available networks and to present a list of the available networks through the user device upon the determination that the communication interface is not connected to the Internet;
a selection module configured to receive a user selection of one of the networks on the list;
a connectivity, module configured to check a connectivity status of the selected network;
a terms module configured to present terms of service of an Internet gateway associated with the selected network through the user device and to accept the terms of service upon receiving a user command; and
a connection module configured to establish a connection to the Internet through the selected network; and
a secure connection configured module to establish the secure connection to the virtual private network via the Internet.

10. A portable proxy for privacy protection, comprising:
a communication interface configured to connect to a user device and to securely connect to an anonymizing service, the communication interface comprising a wireless transceiver configured to create a wireless network through which the communication interface connects to the user device; and
a housing on which a barcode is comprised, the barcode comprising possession verification information; and
a processor coupled to a memory to execute code, comprising:
a permission module configured to receive the possession verification information from the user device and to allow the user device to connect to the wireless network upon receiving the possession verification information;
a routing module to route substantially all Internet traffic of the user device through the anonymizing service using the connection to the user device and the secure connection.

11. A proxy according to claim 10, further comprising:
a connection module configured to determine whether the communication interface is connected to the Internet;
a search module configured to search for available networks and to present a list of the available networks through the user device upon the determination that the communication interface is not connected to the Internet;
a selection module configured to receive a user selection of one of the networks on the list;
a connectivity module configured to check a connectivity status of the selected network;
a terms module configured to present terms of service of an Internet gateway associated with the selected network through the user device and to accept the terms of service upon receiving a user command; and
a connection module configured to establish a connection to the Internet through the selected network; and
a secure connection module configured to establish the secure connection to the anonymizing service via the Internet.

* * * * *